April 10, 1934.  J. H. BRAGG  1,954,065
METHOD AND APPARATUS FOR INCREASING THE VITAMIN CONTENT OF LIQUID FOODS
Original Filed Dec. 21, 1929
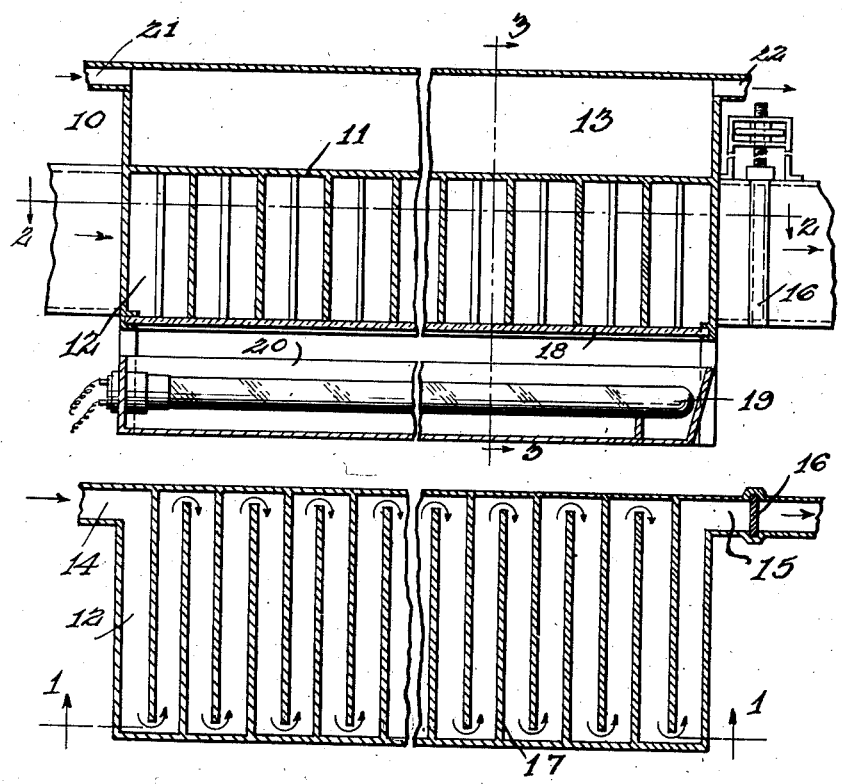

Patented Apr. 10, 1934

1,954,065

UNITED STATES PATENT OFFICE 1,954,065

METHOD AND APPARATUS FOR INCREASING THE VITAMIN CONTENT OF LIQUID FOODS

John H. Bragg, Washington, D. C.

Continuation of application Serial No. 327,561, December 21, 1929. This application April 13, 1932, Serial No. 605,041

13 Claims. (Cl. 99—11)

This invention relates to the method of and means for increasing the vitamin content of liquid foods and has for an object the provision of a new method and an apparatus by means of which milk and other liquid foods may be subjected to the action of ultra-violet rays in a manner to render an apparatus of this character commercially useful.

In the treatment of liquid foods by ultra-violet rays for the purpose of increasing their vitamin content, such as to increase their antirachitic properties, a thorough and uniform exposure of the individual food particles must occur. For this reason liquid foods have been treated by subjecting them in very thin layers to the action of the rays, the process being exceedingly slow and therefore commercially impractical.

The present invention overcomes this and other disadvantageous features heretofore experienced when liquid foods are treated for the purpose above mentioned, by providing a food chamber through which the liquid is passed or circulated and subjecting the liquid during such passage to the ultra-violet rays. This food chamber is of sufficient capacity to make the apparatus commercially useful, and in carrying out the invention, a most important feature resides in the method of and the provision of means for insuring an equal exposure to the rays of all of the particles of the liquid food irrespective of the difference in weight of such particles. This last referred to means acting in connection with the ultra-violet rays produces a gravitational instability of the liquid foodstuff within the food chamber so that as the said liquid food passes through said chamber the individual food particles will move in a direction transverse to the direction of flow of the liquid through the chamber.

With the above and other objects in view, the invention further includes the following novel process, features and details of construction, to be hereinafter more fully described, reference being had to the accompanying drawing illustrating suitable apparatus for practicing the method, wherein Figure 1 is a sectional view of the apparatus with parts broken away; and Figures 2 and 3 are alike views taken respectively on the lines 2—2 and 3—3 of Figure 1.

According to my improved process, I subject the liquid food (for example milk) to the action of ultra-violet rays while it is being circulated through a closed food chamber 12 of a casing or container 10 which advantageously may be provided with a cooling chamber 13 separated from the food chamber by a partition 11 whereby the liquid food under treatment will be continuously cooled during irradiation and bacterial and chemical spoilage prevented.

The food chamber may be of suitable size, shape and capacity whereby milk or other liquid foodstuff to be treated may circulate or pass through in sufficient quantity to render the apparatus commercially useful. For this purpose, the chamber may be sufficiently wide and long but of relatively small depth, the depth however being materially greater in proportion to its length and width than the depth heretofore employed. One end of the chamber is provided with an inlet passage or port 14 through which the liquid food may enter the chamber from a suitable source, while the opposite end is provided with an outlet passage or port 15 controlled by a valve 16. The liquid passes through the chamber by gravity or under pressure as desired, and its rate of flow may be controlled by this valve. The chamber 12 is further provided with baffles 17 which are disposed horizontally within the chamber and extend from one vertical wall and terminate short of the other vertical wall. As shown in Figure 2 of the drawing these baffles are alternately arranged so as to provide a tortuous passage of the liquid through the chamber.

The bottom 18 of the chamber 12 is formed of a material transparent to the passage of ultra-violet rays and located beneath this chamber is a quartz lamp 19 or other suitable source of ultra-violet rays so that the rays will act upon the foodstuff passing or circulated through the chamber and subject the foodstuff to the action of convection currents from the lamp. The lamp 19 is positioned within a reflector 20 which will focus the rays upon the bottom of the chamber 12.

The lamp 19 has a threefold function: first, to generate rays, which as is well known, are capable of increasing the vitamin content of foodstuff exposed to them for prolonged periods known as irradiation; second, to accelerate and maintain through the generation of convection currents in the foodstuff, a very thorough exposure of the individual food particles to the vitamizing ultra-violet rays; and third, (in connection with the cooling chamber 13) to maintain through the generation of convection currents a gravitational instability in the foodstuff being irradiated.

The cooling chamber 13 is positioned above the chamber 12 and remote from the lamp 19, being separated from the chamber 12 by the partition 11. The chamber 13 is provided with an inlet port or passage 21 and an outlet port or passage 22 so that a suitable liquid cooling solution may be passed through this chamber to prevent bacterial and chemical spoilage of the contents of the chamber 12.

As stated, long exposure to ultra-violet rays to satisfactorily increase the vitamin content of foodstuff is necessary. As the source of ultra-violet rays will generate considerable heat, some bacterial and chemical spoilage would occur if the foodstuff were not protected by the cooling chamber above it.

The chamber 13 performs a fourfold function whose first is to prevent bacterial and chemical spoilage of the foodstuff being treated.

The second function of the chamber 13 is to accelerate and maintain through the generation of convection currents in the foodstuff being irradiated, a very thorough exposure of the individual food particles to the vitamizing ultra-violet rays for increasing the antirachitic properties of the foodstuff and thereby eliminate the necessity of treating the foodstuff in an extremely thin layer.

The third function of the chamber 13 is to maintain through the generation of these convection currents a gravitational instability of the contents of the chamber 12 and thus insure an equal treatment of all individual food particles, irrespective of weight. Without this gravitational instability, the foodstuff would pass through the chamber 12 with the heaviest particles adjacent the source of the ultra-violet rays. In the case of milk, there would be a pronounced separation of the lighter and heavier particles. The third function therefore of the cooling chamber prevents this separation and insures uniform radiation of all food particles.

The fourth function of the cooling chamber is to prevent the destruction or lessening by the heat generated by the lamp 19 of the vitamin content originally present in the foodstuff, and the vitamin content subsequently found to be present upon irradiation. Protection of the vitamin content from destruction or diminution by heat is thereby assured.

It will be apparent from the foregoing description of the process and accompanying drawing illustrating the apparatus that by placing the source of ultra-violet rays beneath the chamber 12 and the cooling chamber 13 above said chamber 12, convection currents of marked degree and high speed will be unquestionably produced and these currents will be present in great numbers. The foodstuff passing through the chamber 12 will thus have its individual food particles moved vertically as well as horizontally so that all of the individual particles of the foodstuff will be uniformly subjected to the action of the ultra-violet rays. In other words, by positioning the lamp beneath the chamber 12, the food particles in the bottom of said chamber will be heated and caused to ascend to be acted upon by the cooling agent in the chamber 13, while the food particles at the top of the chamber 12 will be cooled and caused to descend. A rapid and continuous rise and fall of the food particles will thus occur during the passage of the liquid foodstuff through the food chamber. A uniform treatment of the entire contents of the food chamber is thus assured while bacterial and chemical spoilage will be prevented.

The invention is susceptible of various changes in its form, proportions and minor details of construction and the right is herein reserved to make such changes as properly fall within the scope of the appended claims.

This application is a continuation of and a substitute for my copending application Serial No. 327,561, filed December 21, 1929.

Having disclosed my process and one embodiment of the apparatus for carrying it out, what I claim and desire to secure by Letters Patent is:

1. An apparatus for increasing the vitamin content of liquid foodstuff comprising a food chamber having inlet and outlet openings for the passage of liquid foodstuff therethrough, a source of ultra-violet rays beneath said chamber to set up convection currents and increase the vitamins in the contents of said chamber, and means above the top of said chamber to effect a cooling of the contents of the chamber.

2. An apparatus for increasing the vitamin content of liquid foodstuff comprising a food chamber having inlet and outlet openings for the passage of liquid foodstuff therethrough, a source of ultra-violet rays beneath said chamber to increase the vitamin content of the liquid and heat the contents of said chamber, and means above the food chamber to subject the upper stratum of the fluid to a low temperature and produce a gravitational instability of food particles within the chamber.

3. An apparatus for increasing the vitamin content of liquid foods comprising a casing including a food chamber of an appreciable depth and having inlet and outlet ports for the passage of liquid foods therethrough, a source of ultra-violet rays beneath said chamber to act upon the food therein to increase the vitamin content thereof, and means to insure a uniform treatment of all of the food particles during their passage through the chamber, the said means comprising, in combination with the source of the ultra-violet rays, a cooling unit above the said chamber.

4. The process of treating liquid foodstuffs to increase their vitamin content, consisting of simultaneously subjecting different strata of the liquid to the action of a heating agent and a cooling agent and in which the heating agent is capable of increasing the vitamin content of the liquid.

5. The process of treating liquid foodstuffs to increase their vitamin content, consisting of simultaneously subjecting, respectively, the lower and upper strata of a flow of the liquid to the action of a source of ultra-violet rays and a cooling agent, whereby to create convection currents in the flow and thereby effect subjection of all particles of the liquid flow to the action of the source of ultra-violet rays.

6. The process of treating liquid foodstuffs to increase their vitamin content, consisting of creating in the liquid, convection currents of different temperatures moving in opposite directions and subjecting the liquid to the action of ultra-violet rays.

7. The process of treating liquid foodstuffs to increase their vitamin content, which comprises subjecting a slowly flowing mass of the liquid to the action of ultra-violet rays, and creating, in the mass, by gravitational instability, currents flowing in a direction traversing the direction of current flow of the mass.

8. The process of treating liquid foodstuffs to increase their vitamin content, which process comprises subjecting one stratum of a flowing current of the liquid to the action of ultra-violet rays to increase the vitamin content of the liquid and to, likewise, raise the temperature of the said stratum, and subjecting another stratum to the action of a cooling agent to lower the temperature thereof, and, thereby establish convection currents of different temperatures, flowing in different directions to each other and different from the direction of flow of the body of liquid as a whole.

9. The process of treating liquid foodstuff to increase the vitamin content thereof, which consists in moving a mass of the liquid between a source of ultra-violet rays to activate the mass, and a cooling medium to cause a continuous contra-convecting current through said liquid and maintain said liquid at a sufficiently low temperature to prevent rapid bacterial growth.

10. The process of treating liquid foodstuff to increase the vitamin content thereof, which consists in moving a stratum of the liquid between a source of ultra-violet rays and a cooling medium and thus simultaneously setting up contra-convecting currents through said stratum, whereby said source of light and cooling medium act on all portions of said liquid uniformly.

11. The process of treating liquid foods and the like to impart antirachitic properties thereto, which comprises circulating the liquid between a source of ultra violet light and a cooling medium subjecting the fluid under circulation in a closed path to the direct action of ultra-violet rays, such as produced by a mercury vapor lamp, and subjecting the fluid to a cooling agent to avoid substantial injury thereof and continuing the process for a sufficient length of time to effect the desired antirachitic activation.

12. The method of irradiating fluids and substances in solution, which consists in causing a stream of the fluid to be circulated between a source of ultra violet light and a cooling medium in a confined path, exposing successive parts of the moving stream to irradiating rays of ultra-violet light, cooling the exposed parts of the stream, and continuing the treatment until the irradiation is complete.

13. The method of irradiating fluids and substances in solution, which consists in causing a confined stream of the fluid to be continually circulated between a source of ultra violet light and a cooling medium, continuously exposing successive parts of the moving stream to ultra-violet light by passing the stream within the antirachitic activating range of said ultra-violet light, continuously cooling the antirachitic stream and continuing the treatment until the irradiation is complete.

JOHN H. BRAGG.